United States Patent
Kim et al.

(10) Patent No.: US 10,234,692 B2
(45) Date of Patent: Mar. 19, 2019

(54) FLOATING HOLOGRAM APPARATUS

(71) Applicant: KT Corporation, Seongnam-si, Gyeonggi-do (KR)

(72) Inventors: Jong Heum Kim, Seongnam-si (KR); Seung Cheol Kim, Seoul (KR); Tae Gil Yang, Seoul (KR); Sang Hoon Han, Gwangmyeong-si (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/695,179

(22) Filed: Sep. 5, 2017

(65) Prior Publication Data

US 2018/0067329 A1 Mar. 8, 2018

(30) Foreign Application Priority Data

Sep. 5, 2016 (KR) .................. 10-2016-0113783

(51) Int. Cl.
| | |
|---|---|
| *H04N 13/305* | (2018.01) |
| *H04N 9/31* | (2006.01) |
| *G02B 27/22* | (2018.01) |
| *H04N 13/324* | (2018.01) |
| *G02B 5/04* | (2006.01) |

(52) U.S. Cl.
CPC ....... *G02B 27/2292* (2013.01); *G02B 27/225* (2013.01); *G02B 27/2214* (2013.01); *H04N 9/3182* (2013.01); *H04N 13/305* (2018.05); *H04N 13/324* (2018.05); *G02B 5/045* (2013.01)

(58) Field of Classification Search
CPC .. G02B 27/2292; G02B 5/045; H04N 13/305; H04N 9/3182
See application file for complete search history.

(56) References Cited

U.S. PATENT DOCUMENTS

| | | | |
|---|---|---|---|
| 2008/0166043 A1* | 7/2008 | Bassi | G09G 3/2003 382/167 |
| 2008/0273568 A1* | 11/2008 | Schulz | G02B 27/104 372/50.23 |

(Continued)

FOREIGN PATENT DOCUMENTS

| | | |
|---|---|---|
| JP | 3685417 B2 | 8/2005 |
| KR | 1020150102440 A | 9/2015 |

*Primary Examiner* — Jamie J Atala
*Assistant Examiner* — Michael Robert Cammarata
(74) *Attorney, Agent, or Firm* — Brundidge & Stanger, P.C.

(57) ABSTRACT

An optical element may be arranged, relative to an observer, in front of first and second displays. The optical element may include a prism array in which multiple prisms are arranged in series. The optical element may refract light rays incident into one or more prisms toward a viewing direction of the observer in front of the optical element. Virtual images generated by the refracted light rays may generate a floating hologram in the viewing direction of the observer. The virtual images corresponding to the images output from the first display and the second display may be generated between the optical element and the displays. That is, the observer may perceive the virtual images corresponding to the images output from the first display and the second display by the refracted light rays toward the viewing direction of the observer when the observer sees the images through the optical element.

15 Claims, 11 Drawing Sheets

(56) References Cited

U.S. PATENT DOCUMENTS

| | | | |
|---|---|---|---|
| 2010/0232016 A1* | 9/2010 | Landa | G02B 5/1814 359/466 |
| 2013/0009862 A1* | 1/2013 | Chan | G02B 27/2292 345/156 |
| 2013/0215393 A1* | 8/2013 | Kim | G02B 27/2292 353/10 |
| 2014/0362438 A1* | 12/2014 | Kim | G02B 27/2221 359/478 |
| 2016/0314564 A1* | 10/2016 | Jones | G06T 15/04 |
| 2017/0030773 A1* | 2/2017 | Han | G01J 3/0208 |
| 2018/0275414 A1* | 9/2018 | Tanaka | G02B 27/0179 |

* cited by examiner

FLOATING HOLOGRAM APPARATUS

CROSS-REFERENCE TO RELATED APPLICATION

This application claims the benefit under 35 USC 119(a) of Korean Patent Application No. 10-2016-0113783 filed on Sep. 5, 2016, in the Korean Intellectual Property Office, the entire disclosures of which are incorporated herein by reference for all purposes.

TECHNICAL FIELD

The present disclosure relates to a floating hologram apparatus.

BACKGROUND

A hologram is a photographic recording of a light field, rather than of an image formed by a lens, and it is used to display a fully three-dimensional image of the holographed subject.

Current pseudo-holographic technology utilizes an optical illusion known as Pepper's Ghost that exhibits a hologram image reflected through the 2D screen as if the hologram image is floating. Thus, this technology may be referred to as a floating hologram.

Light travels at different speeds in different mediums. Thus, when light travels from one medium to another, light may be refracted on a surface of another medium. Visible light which can be seen by the human eye has the wavelength in the range of from about 400 nm to about 700 nm. When light passes through a prism, the light travels from air to the prism to air. In this case, the light is refracted twice and the angle of incidence of the light is refracted at a certain angle.

A prism can split white light into a spectrum, and the wavelengths of the white light may be refracted differently from each other. A short wavelength (violet) of the spectrum is refracted the most and a long wavelength (red) of the spectrum is refracted the least. Light in nature is white light and includes all of analog frequency components. However, a display represents light in nature by a combination of the three primary colors: red (R), green (G), and blue (B).

Referring to FIG. 1, an image output on a display is represented by a combination of red, green, and blue. Each pixel 103 of the image output on the display includes a red sub-pixel 105, a green sub-pixel 107, and a blue sub-pixel 109.

Since the sub-pixels 105, 107, and 109 have different wavelengths from each other, when a light ray 111 of each pixel 103 passes through a prism 100, the light ray 111 of each pixel 103 is split into a light ray 113 of the red sub-pixel 105, a light ray 115 of the green sub-pixel 107, and a light ray 117 of the blue sub-pixel 109 due to a difference in refractive index among the wavelengths of the respective sub-pixels 105, 107, and 109.

When an observer sees the image through the prism 100, chromatic aberration in which a floating hologram image corresponding to the image output on the display looks blurry may occur due to a difference in refractive index among the light ray 113 of the red sub-pixel 105, the light ray 115 of the green sub-pixel 107, and the light ray 117 of the blue sub-pixel 109.

Japanese Patent No. 3685417 discloses a configuration in which a first prism sheet and a second prism sheet are arranged in almost parallel to each other to minimize dispersion of light passing through the first prism sheet and the second prism sheet.

SUMMARY

According to a first example embodiment, a floating hologram apparatus that generates a floating hologram includes: a display; an optical element in front of the display; a memory that stores chromatic dispersion data that represents degrees of refraction of light rays of a red (R) wavelength, a green (G) wavelength, and a blue (B) wavelength with respect to each pixel of an original image output from the display when the light rays pass through the optical element; a compensated image generation unit that generates a compensated image by rearranging sub-pixels of each pixel of the original image based on the chromatic dispersion data; and an output unit that outputs the compensated image.

According to the first example, the chromatic dispersion data includes position information for each pixel and compensated position information regarding a red sub-pixel, a green sub-pixel, and a blue sub-pixel for each pixel.

According to the first example, the chromatic dispersion data includes multiple mapping tables corresponding to configuration information of the floating hologram apparatus.

According to the first example, the compensated image generation unit reads a mapping table corresponding to the configuration information of the floating hologram apparatus from among the multiple mapping tables and generates the compensated image based on the read mapping table.

According to the first example, the compensated position information varies depending on the configuration information of the floating hologram apparatus.

According to the first example, the configuration information of the floating hologram apparatus includes at least one of a position of the display, a position of the optical element, a shape of the optical element, an interval between prisms of the optical element, and a position of an observer.

According to the first example, the optical element includes a prism array in which multiple prisms are arranged.

According to the first example, the compensated image generation unit is further configured to rearrange the red sub-pixel, the green sub-pixel, and the blue sub-pixel of each pixel based on the compensated position information.

According to the first example, light rays corresponding to the rearranged red sub-pixel, green sub-pixel, and blue sub-pixel are refracted when the light rays pass through the optical element and focused on a single pixel at a predetermined area.

According to the first example, the output unit is configured to output the compensated image in which the sub-pixels of each pixel are rearranged. The compensated image is encoded while the compensated image is output.

According to the first example, the compensated image is encoded prior to outputting the compensated image. The output unit is configured to output the compensated image which is previously encoded.

According to another example embodiment, a floating hologram apparatus includes: an optical element that generates a floating hologram in a predetermined area by refracting a light ray corresponding to an original image output from a display; a simulation unit that irradiates a white light ray from a predetermined position to the optical element, and generates chromatic dispersion data representing degrees of refraction of light rays of a red (R) wavelength, a green (G) wavelength, and a blue (B) wavelength with respect to the white light ray when the white light ray passes through the optical element; and a compensated image generation unit that generates a compensated image by rearranging sub-pixels of each pixel of the original image output from the display based on the chromatic dispersion data.

According to the another example, the simulation unit also determines positions of a red sub-pixel, a green sub-pixel, and a blue sub-pixel in the display when the white light ray irradiated from the predetermined position toward a first hologram position in the predetermined area is refracted through the optical element and reaches the display, wherein the first hologram position corresponds to a first pixel of the original image. The simulation unit further determines positions of a red sub-pixel, a green sub-pixel, and a blue sub-pixel in the display when the white light ray irradiated from the predetermined position toward a second hologram position in the predetermined area is refracted through the optical element and reaches the display, wherein the second hologram position corresponds to a second pixel of the original image.

According to the another example, the chromatic dispersion data includes a mapping table regarding position information of the first pixel and compensated position information of sub-pixels of the first pixel, and position information of the second pixel and compensated position information of sub-pixels of the second pixel.

According to the another example, the compensated image generation unit also rearranges the sub-pixels of the first pixel based on the compensated position information of the sub-pixels of the first pixel and rearranges the sub-pixels of the second pixel based on the compensated position information of the sub-pixels of the second pixel.

According to a third example embodiment, a floating hologram apparatus that generates a floating hologram includes: a display; an optical element arranged in front of the display; a memory that stores a corrected image generated by rearranging sub-pixels of each pixel of an original image output from the display based on the chromatic dispersion data; and an output unit that outputs the corrected image. The chromatic dispersion data represent degrees of refraction of light rays of a red (R) wavelength, a green (G) wavelength, and a blue (B) wavelength corresponding to the each pixel of the original image when the light rays pass through the optical element.

The above-described example embodiments are provided by way of illustration only and should not be construed as limiting the present disclosure. Besides the above-described exemplary embodiments, there may be additional exemplary embodiments described in the accompanying drawings and the detailed description.

According to any one of the above-described example embodiments, it is possible to remove a chromatic aberration which occurs when a light ray of an original image output from a display passes through an optical element that generates a floating hologram.

According to at least some example embodiments, a floating hologram apparatus may generate a compensated image by rearranging sub-pixels of each pixel of an original image based on the chromatic dispersion data representing degrees of refraction of light rays of a red wavelength, a green wavelength, and a blue wavelength from each pixel with respect to the original image output from a display when the light rays pass through an optical element and thus can minimize chromatic aberration and image distortion.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
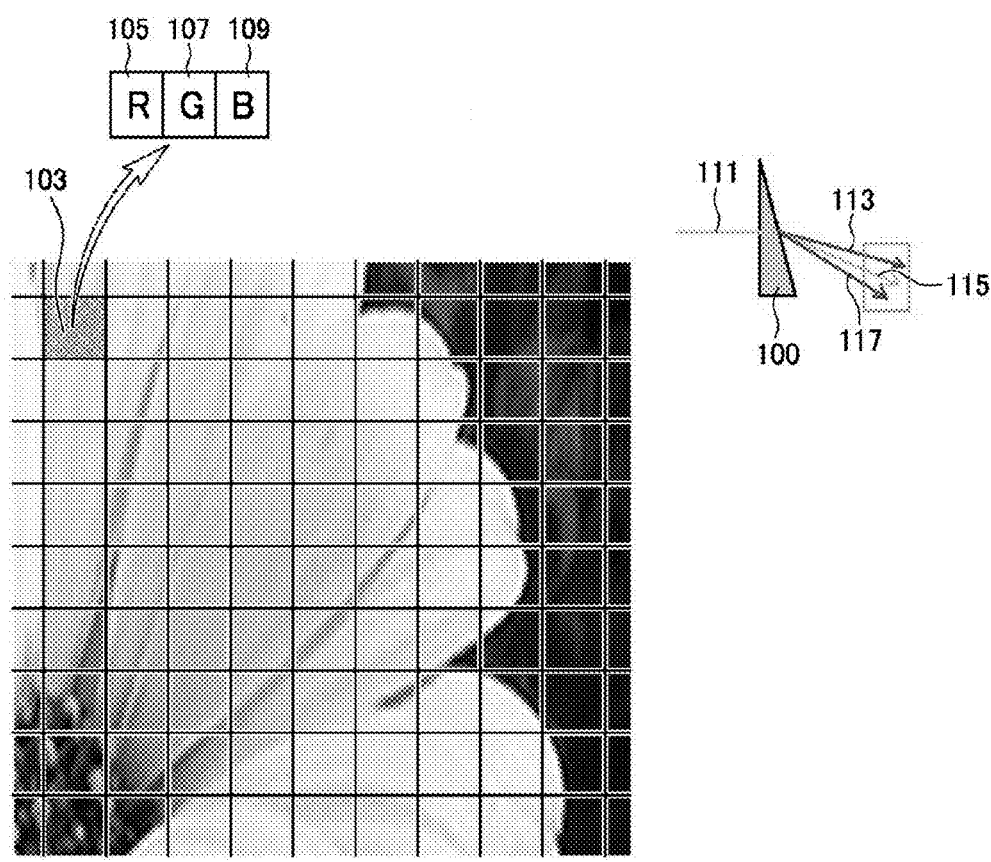
FIG. 1 is a diagram provided to explain chromatic aberrations.

Hereafter, embodiments will be described in detail with reference to the accompanying drawings so that the present disclosure may be readily implemented by those skilled in the art. However, it is to be noted that the embodiments described in the present disclosure are not so limited, but can be embodied in various other ways. In drawings, parts that may be irrelevant to the description are omitted for the simplicity of explanation, and like reference numerals denote like parts through the whole document.

Through the whole document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "unit" includes a unit implemented by hardware, software, and/or firmware, in various combinations and/or quantity.

Throughout the whole document, a part of an operation or function described as being carried out by a terminal or device may be carried out by a server connected to the terminal or device. Likewise, a part of an operation or function described as being carried out by a server may be carried out by a terminal or device connected to the server.

Hereafter, an exemplary embodiment of the present disclosure will be described in detail with reference to the accompanying configuration views or process flowcharts.

Figure 2:
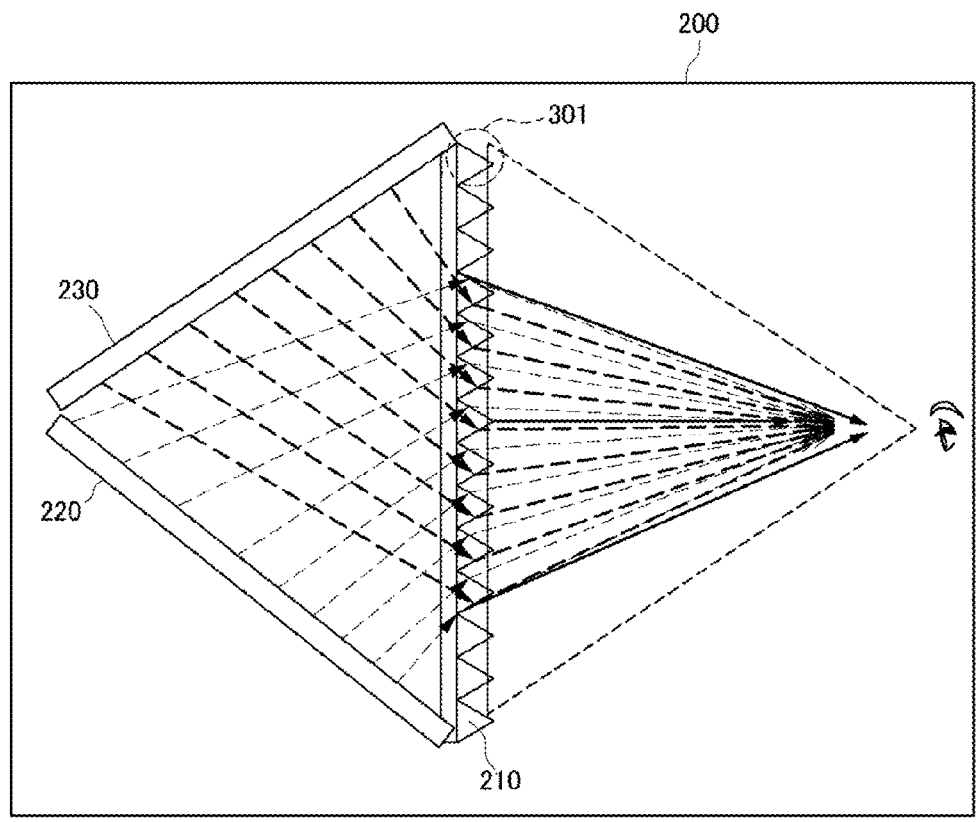
FIG. 2 is a view of a floating hologram apparatus in accordance with an exemplary embodiment.

FIG. 2 is a view of a floating hologram apparatus 200 in accordance with an exemplary embodiment. Referring to FIG. 2, the floating hologram apparatus 200 may include an optical element 210, a first display 220, and a second display 230.

The optical element 210 may be arranged, relative to an observer/user, in front of the first display 220 and the second display 230. The optical element 210 may include, for example, a prism array, i.e., 210 in which multiple embodiments of prism 301 are arranged in series. The optical element 210 may refract one or more light rays incident into one or more prisms toward a viewing direction of the observer in front of the optical element 210. One or more virtual images generated by the one or more refracted light rays may generate a floating hologram in the viewing direction of the observer. The virtual images, i.e. the floating hologram corresponding to the images output from the first display 220 and the second display 230 may be generated between the optical element 210 and the displays 220, 230. That is, the observer may perceive the virtual images corresponding to the images output from the first display 220 and the second display 230 by the refracted light rays toward the viewing direction of the observer when the observer sees the images through the optical element 210.

A prism refracts parallel incident light at a certain angle. A prism having a trigonal prism shape thus allows two different light rays to pass through and then travel in the same direction.

When multiple first light rays of an original image output from the first display 220 are incident, the optical element 210 may refract the incident first light rays in the viewing direction of the observer or to the front of the optical element 210. Also, when multiple second light rays of an original image output from the second display 230 are incident, the optical element 210 may refract the incident second light rays in the viewing direction of the observer or to the front of the optical element 210. A floating hologram image may be generated by combining a first virtual image generated using the refracted first light rays and a second virtual image generated using the refracted second light rays.

An arrangement of the floating hologram apparatus 200 may be determined based on at least one of a location in which the floating hologram is to be generated in the space between the displays 220, 230 and the optical element 210, a distance from the observer to the location in which the floating hologram is generated and a size of the floating hologram. For example, both of the first display 220 and the second display 230 may be arranged to be perpendicular to the optical element 210. In this case, a distance between the first display 220 and the second display 230 may be determined based on a location in which the first virtual image is generated and a location in which the second virtual image is generated. In another example, both of the first display 220 and the second display 230 may be arranged diagonally or tilted at a certain angle as illustrated in FIG. 2. In this case, an angle between each of the displays 220, 230 and the optical element 210 may be determined based on the size of the floating hologram. For yet another example, one of first display 220 and the second display 230 may be arranged to be perpendicular to the optical element 210 and the other may be arranged diagonally or tilted.

The first display 220 and the second display 230 may be arranged in various manners depending on the angle of refraction through the optical element 210.

The first display 220 and the second display 230 may be respectively implemented as an image display device such as a LCD display or a LED display. Further, the first display 220 and the second display 230 may be substituted by a projector. Furthermore, the floating hologram apparatus 200 may include only one display.

Although FIG. 2 illustrates that the floating hologram apparatus 200 includes the first display 220 and the second display 230, the present disclosure is not limited thereto. For example, the floating hologram apparatus 200 may include only one display. In this case, light rays of an original image output from the display may be incident into the optical element 210 and refracted and thus may generate a floating hologram.

Figure 3:
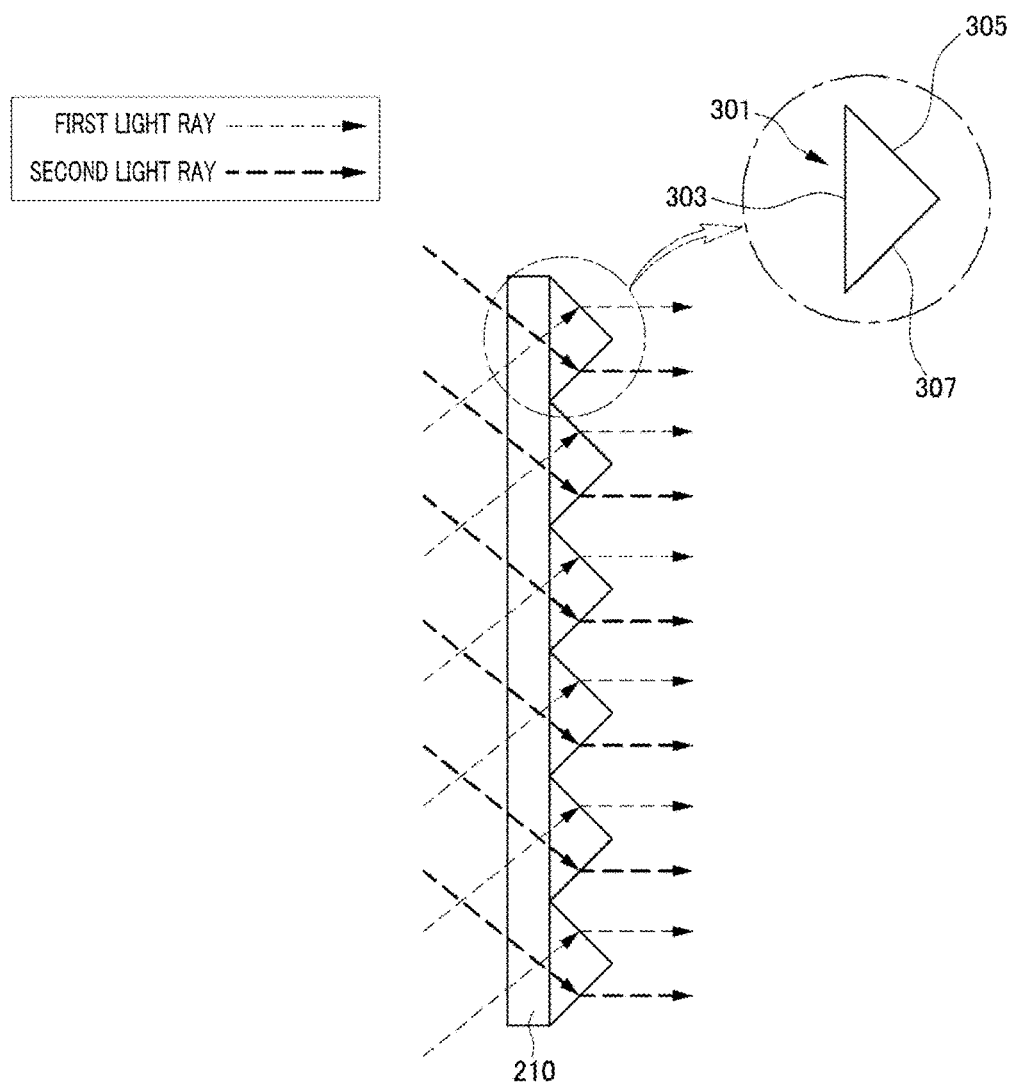
FIG. 3 illustrates an optical element of FIG. 2 in accordance with an exemplary embodiment.

Hereafter, an operation of each component of the floating hologram apparatus illustrated in FIG. 2 will be described in more detail. FIG. 3 illustrates the optical element 210 of FIG. 2 in accordance with an exemplary embodiment of the present disclosure.

Referring to FIG. 3, the optical element 210 may include a prism array, i.e., 210, including multiple embodiments of prism 301 arranged in series and configured to refract a first light ray incident in a first direction toward the viewing direction of an observer/user and a second light ray incident in a second direction different from the first direction toward the viewing direction of the observer/user.

The multiple embodiments of prism 301 are arranged in a direction perpendicular to the viewing direction of the observer/user. Each of the multiple prisms includes an incident surface 303 which is an optical plane into which a light ray is incident, a first facet 305 which is an optical plane configured to refract a first light ray of an original image output from the first display 220 positioned at a lower end, and a second facet 307 which is an optical plane configured to refract a second light ray of an original image output from the second display 230 positioned at an upper end, i.e., in a direction different from that of the first light ray. The refracted first light ray and the refracted second light ray may travel in parallel to each other toward the viewing direction of the observer/user.

Figure 4:
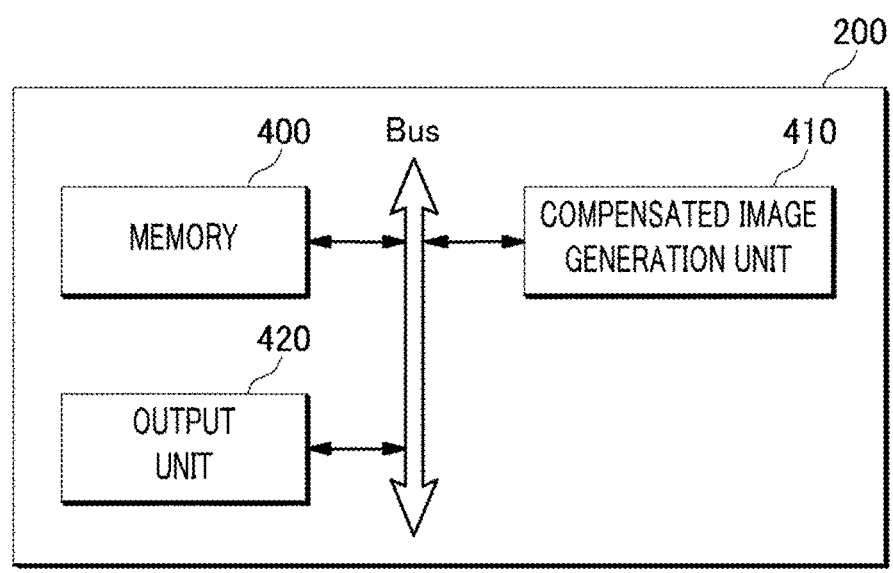
FIG. 4 is a block diagram of the floating hologram apparatus in accordance with an exemplary embodiment.

FIG. 4 is a block diagram of the floating hologram apparatus 200 in accordance with an exemplary embodiment of the present disclosure. Referring to FIG. 4, the floating hologram apparatus 200 may include a memory 400, a compensated image generation unit 410, and an output unit 420. However, the floating hologram apparatus 200 illustrated in FIG. 4 is just an exemplary embodiment of the present disclosure and can be modified in various ways on the components illustrated in FIG. 4.

The memory 400 may store chromatic dispersion data representing degrees of refraction of light rays of a red (R) wavelength, a green (G) wavelength, and a blue (B) wavelength with respect to each pixel of the original image output from the display when the light rays pass through the optical element 210.

The chromatic dispersion data may include a mapping table regarding position information of each pixel and compensated position information of a red sub-pixel, a green sub-pixel, and a blue sub-pixel of each pixel with respect to the original image.

Specifically, the compensated position information of a red sub-pixel, a green sub-pixel, and a blue sub-pixel of each pixel may refer to information representing the degree of refraction of a light ray with respect to each pixel that passes through the optical element 210 and is dispersed into light rays of a red wavelength, a green wavelength, and a blue wavelength (i.e., a light ray of a red sub-pixel, a light ray of a green sub-pixel, and a light ray of a blue sub-pixel) with respect to all the pixels of the original image output from the display.

The compensated position information may include position information representing the coordinates of the light rays of a red wavelength, a green wavelength, and a blue wavelength refracted through the optical element 210 in a predetermined area (i.e., an area where a virtual image is formed when a user views the floating hologram apparatus 200 at a predetermined position). As an example, compensated position information of sub-pixels with respect to a first pixel of the original image may include position information of a sub-pixel for a red light ray, position information of a sub-pixel for a green light ray, and position information of a sub-pixel for a blue light ray when a light ray of the first pixel of an original image output from the display passes through an optical element and reaches a predetermined area. The chromatic dispersion data of the first pixel of the original image may include a mapping table in which position information of the first pixel of the original image is mapped to position information of a sub-pixel for a refracted red light ray, position information of a sub-pixel for a refracted green light ray, and position information of a sub-pixel for a refracted blue light ray with respect to the first pixel.

The chromatic dispersion data may include multiple mapping tables corresponding to configuration information of the floating hologram apparatus 200. The configuration information may include at least one of a position of the display, a position of the optical element 210, a shape of the optical element 210, an interval between prisms 301 of the optical element 210, and a position of the observer. For example, the configuration information may include a distance between the observer and the optical element 210 and a viewing angle of the observer, or may include the vertical angle of a prism, an arrangement structure of prisms, and the refractive index of a prism. Further, the configuration information may include a pixel size of the display and a distance and an angle between the display and the optical element 210.

The chromatic dispersion data may include multiple mapping tables in consideration of all combinations of the above-described configuration information. For example, the chromatic dispersion data may include a first mapping table for when the display is separated from the optical element 210 by a first distance, and a second mapping table for when the display is separated from the optical element 210 by a second distance. Further, the chromatic dispersion data may include a third mapping table for when the hologram apparatus 200 is separated from the observer by a third distance, and a fourth mapping table for when the hologram apparatus 200 is separated from the observer by a fourth distance.

The compensated image generation unit 410 may read chromatic dispersion data from the memory 400 and generate a compensated image by rearranging sub-pixels of each pixel of the original image based on the chromatic dispersion data. For example, the compensated image generation unit 410 may read chromatic dispersion data suitable for the configuration information of the floating hologram apparatus 200 from multiple chromatic dispersion data.

An image corresponding to a first pixel at a first position of an original image output from the display is expected to be formed at a second position corresponding to the first pixel in a predetermined area. The predetermined area may refer to one area where a user perceives the floating hologram when the user views the image through the optical element 210 at a predetermined position among area between the displays 220, 230 and the optical element 210. In this case, if chromatic aberration of a light ray of the first pixel of the original image is not removed, when the light ray of the first pixel passes through the optical element 210 the light ray is split into a light ray of a red wavelength, a light ray of a green wavelength, and a light ray of a blue wavelength due to a difference in refractive index among the wavelengths. Therefore, when an observer sees the image through the prism 100, the chromatic aberration may occur.

As such, when a light ray of each pixel is incident into the optical element 210 and refracted, light rays of a red wavelength, a green wavelength, and a blue wavelength of each pixel are dispersed to different positions. Thus, chromatic aberration of a floating hologram may occur.

According to the present disclosure, the floating hologram apparatus 200 may generate chromatic dispersion data about the first pixel by matching information about a position of the first pixel with compensated position information for positions of the respective red sub-pixel, green sub-pixel, and blue sub-pixel of the first pixel. Further, the floating hologram apparatus 200 may rearrange positions of the respective red sub-pixel, green sub-pixel, and blue sub-pixel of the first pixel from the position of the first pixel based on the chromatic dispersion data.

Thus, it is possible to remove the chromatic aberration which occurs when the light rays of the rearranged red sub-pixel, green sub-pixel, and blue sub-pixel passe through the optical element 210.

When light rays of the rearranged red sub-pixel, green sub-pixel, and blue sub-pixel are refracted through the optical element 210 and focused on a single pixel at a predetermined area. That is, pixels at the floating hologram imagewith respect to the rearranged red sub-pixel, green sub-pixel, and blue sub-pixel are focused on a single pixel. In this case, the compensated position information may include information regarding positions at which the respective red sub-pixel, green sub-pixel, and blue sub-pixel of the first pixel are to be rearranged in the display. On the other hand, the compensated position information may include information regarding distances from the position of the first pixel to the positions at which the respective red sub-pixel, green sub-pixel, and blue sub-pixel are to be rearranged. Herein, the information about distances may include distances and directions from the first pixel. Further still, the compensated position information may vary depending on configuration information of the floating hologram apparatus 200.

A method of performing a simulation to generate chromatic dispersion data will be described later with reference to FIG. 9 to FIG. 11.

The chromatic dispersion data generated by floating hologram apparatus 200 may include matching information of the coordinates of the first pixel of an original image output from the display and the coordinates of positions at which the red sub-pixel, green sub-pixel, and blue sub-pixel of the first pixel are to be rearranged in the display.

Further, the chromatic dispersion data may include matching information in which the coordinates of the first pixel are matched with information about distances from the first pixel to positions at which the respective red sub-pixel, green sub-pixel, and blue sub-pixel are to be rearranged.

The compensated image generation unit 410 may rearrange the sub-pixels of the first pixel based on the compensated position information of the sub-pixels of the first pixel.

For example, it may be assumed that coordinate of the first pixel is (1, 1), coordinate of a first compensated position at which the red sub-pixel of the first pixel is to be arranged is (1, 2), coordinate of a second compensated position at which the blue sub-pixel of the first pixel is to be arranged is (1, 3) and coordinate of a third compensated position at which the green sub-pixel of the first pixel is to be arranged is (1, 4). The compensated image generation unit 410 may change the coordinate of the red sub-pixel from (1, 1) to (1, 2). Further, the compensated image generation unit 410 may change the coordinate of the green sub-pixel from (1, 1) to (1, 3). Further, the compensated image generation unit 410 may change the coordinate of the blue sub-pixel from (1, 1) to (1, 4) in order to remove chromatic aberration with respect to the first pixel.

That is, the compensated image generation unit 410 may move the sub-pixels from (1, 1) to (1, 2). Further, the compensated image generation unit 410 may move the green sub-pixel of the first pixel from (1, 1) to (1, 3). Further, the compensated image generation unit 410 may move the blue sub-pixel of the first pixel from (1, 1) to (1, 4) in order to remove chromatic aberration in the first pixel. The compensated image generation unit 410 may perform this rearrangement process for all of the pixels.

When the rearrangement process is performed, the rearranged sub-pixels of each pixel are focused on the same positions in a floating hologram generated in the predetermined area according to the Fermat's principle. For example, light rays of the rearranged sub-pixel of the first pixel are incident into the optical element 210 and refracted and then reach a single pixel at the predetermined area.

Since the sub-pixels of each pixel are rearranged based on the chromatic dispersion data, a floating hologram from which chromatic aberration is removed can be provided. Therefore, it is possible to minimize distortion of the floating hologram.

The compensated image generation unit 410 may read a mapping table corresponding to configuration information of the floating hologram apparatus 200 from among the multiple mapping tables and generate a compensated image based on the read mapping table.

For example, the compensated image generation unit 410 may check configuration information of the floating hologram apparatus 200 to output a floating hologram; read a mapping table corresponding to the configuration information from among the multiple mapping tables; generate a compensated image based on the mapping table corresponding to the configuration information; and generate a compensated image by rearranging a red sub-pixel, a green sub-pixel, and a blue sub-pixel of each pixel based on the compensated position information of the red sub-pixel, the green sub-pixel, and the blue sub-pixel of each pixel. Accordingly, light rays with respect to the rearranged red sub-pixel, green sub-pixel, and blue sub-pixel may be refracted through the optical element 210 and may be focused on a single pixel in a floating hologram in a predetermined area.

The output unit 420 may output a compensated image in which the sub-pixels of each pixel are rearranged. The output unit 420 may encode the compensated image in real time when the compensated image is output, or may output the compensated image which is previously encoded.

Meanwhile, it will be fully understood by those skilled in the art that the memory 300, the compensated image generation unit 410, and the output unit 420 may be implemented as separate components or one or more of them may be implemented as an integrated component.

Figure 5:
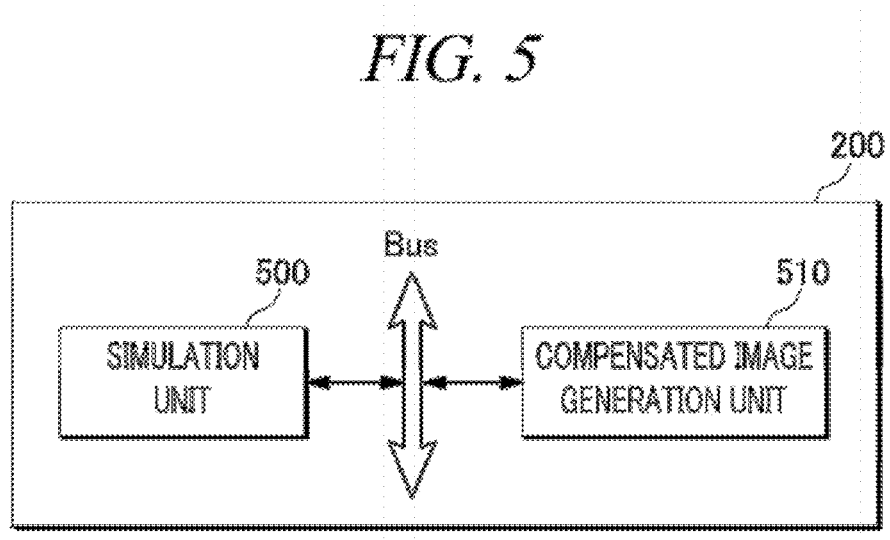
FIG. 5 is a block diagram of the floating hologram apparatus in accordance with another exemplary embodiment.

FIG. 5 is a block diagram of the floating hologram apparatus 200 in accordance with another exemplary embodiment of the present disclosure. Referring to FIG. 5, the floating hologram apparatus 200 may include a simulation unit 500 and a compensated image generation unit 510. However, the floating hologram apparatus 200 illustrated in FIG. 5 is just an exemplary embodiment of the present disclosure and can be modified in various ways on the components illustrated in FIG. 5.

The simulation unit 500 may irradiate a white light ray from a predetermined position (e.g., a position of the observer) toward the optical element 210 and determine positions of a red sub-pixel, a green sub-pixel, and a blue sub-pixel when the irradiated white light ray is refracted through the optical element 210 and reaches the display.

For example, the simulation unit 500 may irradiate a white light ray from a predetermined position toward a hologram position in the determined area (area where a virtual image is formed). Here, the hologram position corresponds to the first pixel of an original image. The simulation unit 500 may determine positions of a red sub-pixel, a green sub-pixel, and a blue sub-pixel when the irradiated white light ray is refracted through the optical element 210 and reaches the display. The compensated position information may include information regarding positions of the respective red sub-pixel, green sub-pixel, and blue sub-pixel of the first pixel in the determined area (the sub-pixels in the predetermined area are separated due to a difference in refractive index).

Hereafter, processing for generating chromatic aberration data will be described with reference to FIG. 9 to FIG. 11.

Figure 9:
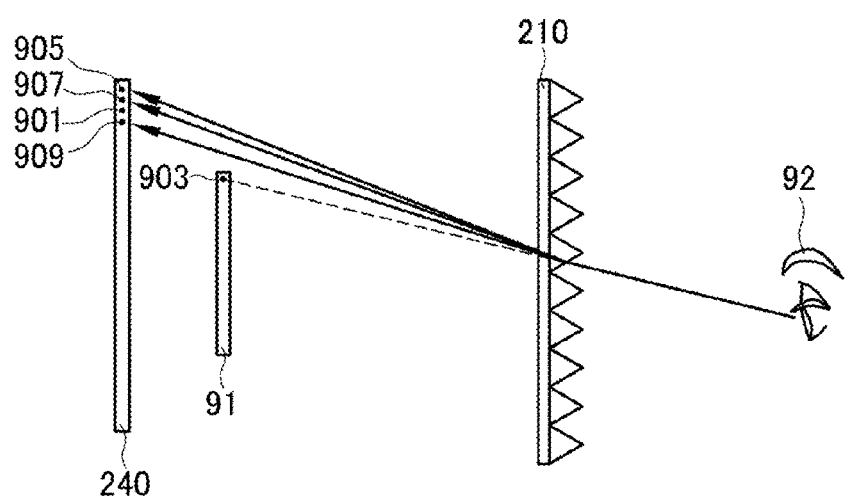
FIG. 9 illustrates a simulation in accordance with an exemplary embodiment.

Referring to FIG. 9, the simulation unit 500 may irradiate a white light ray from a position 92 of the observer toward a hologram position 903 corresponding to a first pixel 901 in an area 91 where a virtual image is formed. In this case, the irradiated white light ray is refracted through the optical element 210 and sub-pixels of the white light ray reach different positions in the display 220. That is, as illustrated in FIG. 9, a red sub-pixel reaches a first position 905, a green sub-pixel reaches a second position 907, and a blue sub-pixel reaches a third position 909.

The simulation unit 500 may map the coordinates of the first pixel 901 to the coordinates of the first position 905, the second position 907, and the third position 909. Further, the simulation unit 500 may map the position of the first pixel 901 to distance information including directions and distances from the position of the first pixel 901 to the first position 905, the second position 907, and the third position 909.

The simulation unit 500 may generate chromatic aberration data by performing the above-described simulation for all of the pixels. The respective sub-pixels of the first pixel 901 are rearranged to the first position 905, the second position 907, and the third position 909. For example, coordinate of the red sub-pixel from 901 to 905. Further, coordinate of the green sub-pixel may be changed from 901 to 907. Further, coordinateof the blue sub-pixel may be changed from 901 to 909. When the respective sub-pixels of the first pixel 901 are rearranged to the first position 905, the second position 907, and the third position 909 and then output, light rays irradiated from the respective sub-pixels at the first position 905, the second position 907, and the third position 909 are refracted through the optical element 210 and focused on a single pixel at a predetermined area. That is, chromatic aberration is removed with respect to the first pixel.

Figure 10:
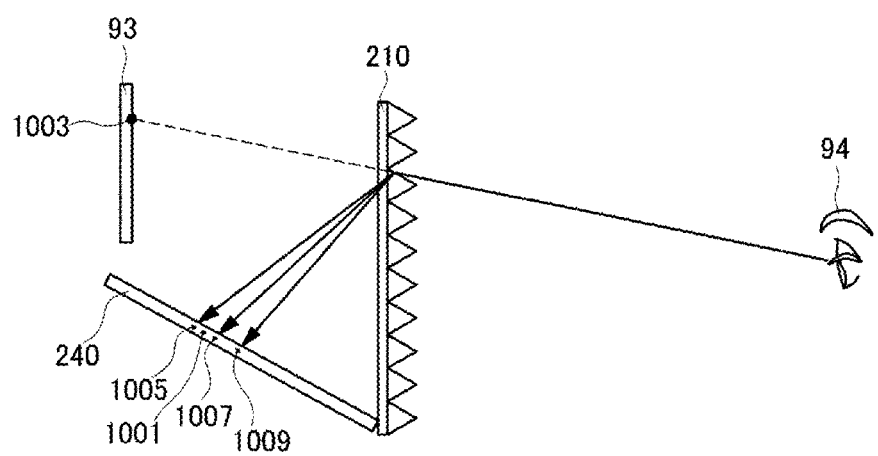
FIG. 10 illustrates a simulation in accordance with another exemplary embodiment.

Referring to FIG. 10, the simulation unit 500 may irradiate a white light ray from a position 94 of the observer toward a hologram position 1003 corresponding to a first pixel 1001 in an area 93 where a virtual image is formed. In this case, the irradiated white light ray is refracted through the optical element 210 and sub-pixels of the white light ray reach different positions in the display 220. That is, as illustrated in FIG. 10, a red sub-pixel reaches a first position 1005, a green sub-pixel reaches a second position 1007, and a blue sub-pixel reaches a third position 1009.

The simulation unit 500 may map the coordinates of the first pixel 1001 to the coordinates of the first position 1005, the second position 1007, and the third position 1009. Further, the simulation unit 500 may map the position of the first pixel 1001 to distance information including directions and distances from the position of the first pixel 1001 to the first position 1005, the second position 1007, and the third position 1009.

The simulation unit 500 may generate chromatic aberration data by performing the above-described simulation for all of the pixels. If a hologram image is output by rearranging the sub-pixels of each pixel according to the result of the simulation, a floating hologram from which chromatic aberration is removed can be provided. For example, when the respective sub-pixels of the first pixel 1001 are rearranged to the first position 1005, the second position 1007, and the third position 1009 and then output, light rays irradiated from the respective sub-pixels at the first position 1005, the second position 1007, and the third position 1009 are refracted through the optical element 210 and focused on a hologram position 1003 corresponding to the first pixel 1001 according to the Fermat's principle. That is, chromatic aberration is removed with respect to the first pixel.

Figure 11:
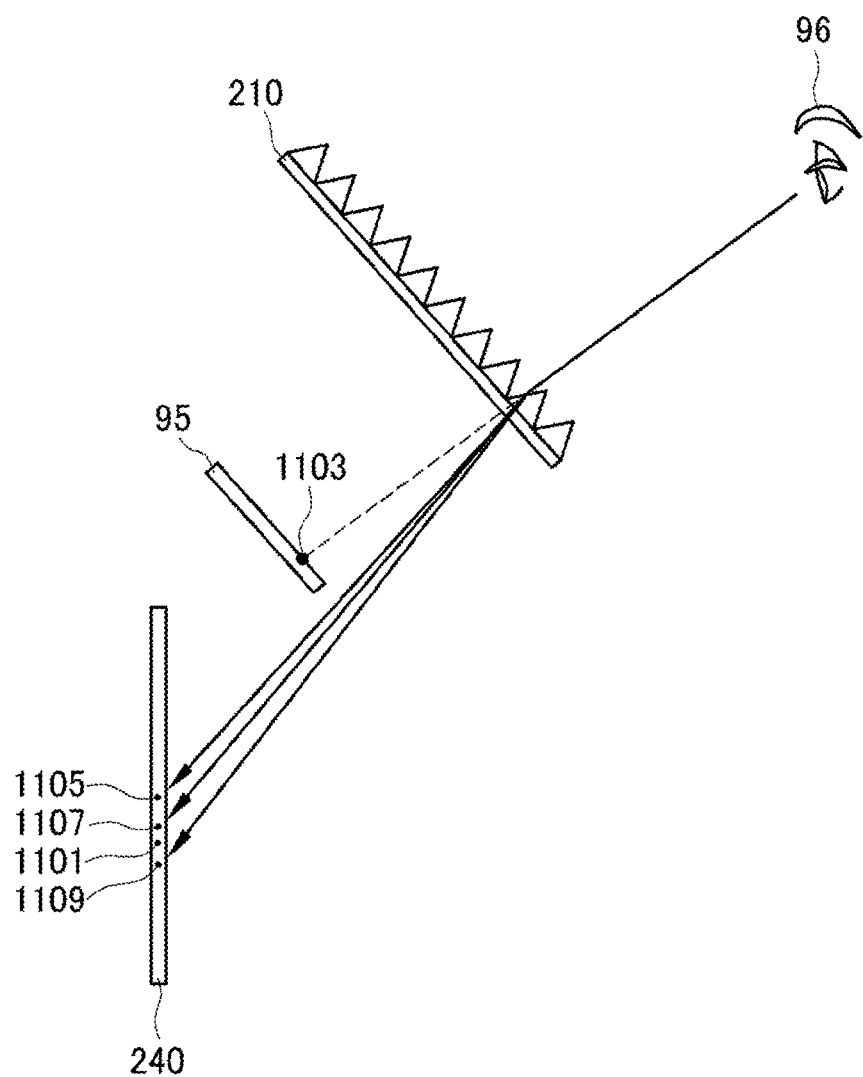
FIG. 11 illustrates a simulation in accordance with yet another exemplary embodiment.

Referring to FIG. 11, the simulation unit 500 may irradiate a white light ray from a position 96 of the observer toward a hologram position 1103 corresponding to a first pixel 1101 in an area 95 where a virtual image is formed. In this case, the irradiated white light ray is refracted through the optical element 210 and sub-pixels of the white light ray reach different positions in the display 220. That is, as illustrated in FIG. 11, a red sub-pixel reaches a first position 1105, a green sub-pixel reaches a second position 1107, and a blue sub-pixel reaches a third position 1109.

The simulation unit 500 may map the coordinates of the first pixel 1101 to the coordinates of the first position 1105, the second position 1107, and the third position 1109. Further, the simulation unit 500 may map the position of the first pixel 1101 to distance information including directions and distances from the position of the first pixel 1101 to the first position 1105, the second position 1107, and the third position 1109.

The simulation execution unit 500 may generate chromatic aberration data by performing the above-described simulation for all of the pixels. If a hologram image is output by rearranging the sub-pixels of each pixel according to the result of the simulation, a floating hologram from which chromatic aberration is removed can be provided. For example, when the respective sub-pixels of the first pixel 1101 are rearranged to the first position 1105, the second position 1107, and the third position 1109 and then output, light rays irradiated from the respective sub-pixels at the first position 1105, the second position 1107, and the third position 1109 are refracted through the optical element 210 and focused on a hologram position 1103 corresponding to the first pixel 1101 according to the Fermat's principle. That is, chromatic aberration is removed with respect to the first pixel.

The simulation unit 500 may irradiate a white light ray from a predetermined position to the optical element 210 and generate chromatic dispersion data of pixels representing the degrees of refraction of light rays of a red wavelength, a green wavelength, and a blue wavelength with respect to the white light ray when the white light ray passes through the optical element 210.

The chromatic dispersion data of pixels may include a mapping table regarding position information of a first pixel and compensated position information of sub-pixels of the first pixel, and position information of a second pixel and compensated position information of sub-pixels of the second pixel. For example, the chromatic dispersion information may include matching information of the coordinates of a position of a first pixel of an original image output from the display and the coordinates of positions of a red sub-pixel, a green sub-pixel, and a blue sub-pixel of the first pixel (compensated position information of the sub-pixels) when a light ray with respect to the first pixel is refracted through the optical element 210 and reaches a predetermined area (the sub-pixels in the predetermined area are spaced away by a certain distance from the position corresponding to the first pixel in the predetermined area due to a difference in refractive index). Otherwise, the chromatic dispersion data may include the coordinates of a position of the first pixel and the coordinates of positions at which the respective red sub-pixel, green sub-pixel, and blue sub-pixel of the first pixel are to be rearranged in the display. Alternatively, the chromatic dispersion data may include matching information in which the coordinates of a position of the first pixel are matched with information about distances from the coordinates of the position of the first pixel to positions at which the respective red sub-pixel, green sub-pixel, and blue sub-pixel of the first pixel are to be rearranged. Herein, the information about distances may include distances and directions from the coordinates of the position of the first pixel.

The compensated position information of the sub-pixels of the first pixel corresponds to position information of a red sub-pixel, a green sub-pixel, and a blue sub-pixel in the display when a white light ray irradiated from a predetermined position toward a hologram position corresponding to the first pixel of an original image in a predetermined area is refracted through the optical element 210 and reaches the display.

The compensated position information of the sub-pixels of the second pixel corresponds to position information of a red sub-pixel, a green sub-pixel, and a blue sub-pixel in the display when a white light ray irradiated from a predetermined position toward a hologram position corresponding to the second pixel of the original image in the predetermined area is refracted through the optical element 210 and reaches the display.

The simulation unit 500 may generate multiple mapping tables by performing multiple simulations depending on configuration information of the floating hologram apparatus 200. The simulation unit 500 may generate multiple mapping tables by performing multiple simulations in consideration of all combinations of the configuration information. For example, the configuration information may include at least one of a position of the display, a position of the optical element 210, a shape of the optical element 210, an interval between prisms of the optical element 210, and a position of the observer. For example, the configuration information may include a distance between the observer and the optical element 210 and a viewing angle of the observer, or may include the vertical angle of a prism, an arrangement structure of prisms, and the refractive index of a prism. Further, the configuration information may include a pixel size of the display and a distance and an angle between the display and the optical element 210.

The compensated image generation unit 510 may generate a compensated image by rearranging sub-pixels of each pixel of an original image output from the display based on the chromatic dispersion data of pixels. For example, the compensated image generation unit 510 may rearrange sub-pixels of a first pixel based on the compensated position information of the sub-pixels of the first pixel and sub-pixels of a second pixel based on the compensated position information of the sub-pixels of the second pixel.

Meanwhile, it will be fully understood by those skilled in the art that the simulation execution unit 500 and the compensated image generation unit 510 may be implemented as separate components or one or more of them may be implemented as an integrated component.

Figure 6:
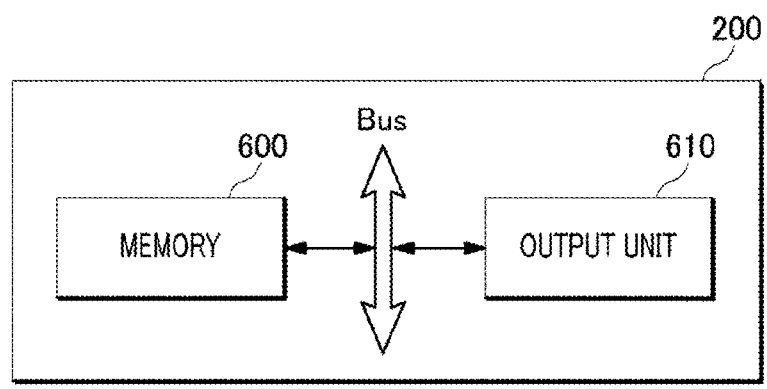
FIG. 6 is a block diagram of the floating hologram apparatus in accordance with yet another exemplary embodiment.

FIG. 6 is a block diagram of the floating hologram apparatus 200 in accordance with yet another exemplary embodiment of the present disclosure. Referring to FIG. 6, the floating hologram apparatus 200 may include a memory 600 and an output unit 610. However, the floating hologram apparatus 200 illustrated in FIG. 6 is just an exemplary embodiment of the present disclosure and can be modified in various ways on the components illustrated in FIG. 6.

The memory 600 may store a compensated image generated by rearranging sub-pixels of each pixel of an original image output from the display based on the chromatic dispersion data. For example, the compensated image may be generated according to the exemplary embodiment illustrated in FIG. 5.

The chromatic dispersion data may refer to data representing the degrees of refraction of light rays of a red wavelength, a green wavelength, and a blue wavelength with respect to each pixel of the original image when the light rays pass through an optical element. The chromatic dispersion data have been described in detail with reference to FIG. 4 and FIG. 5. Therefore, detailed descriptions thereof will be omitted.

The output unit 610 may output the compensated image stored in the memory 600.

Figure 7:
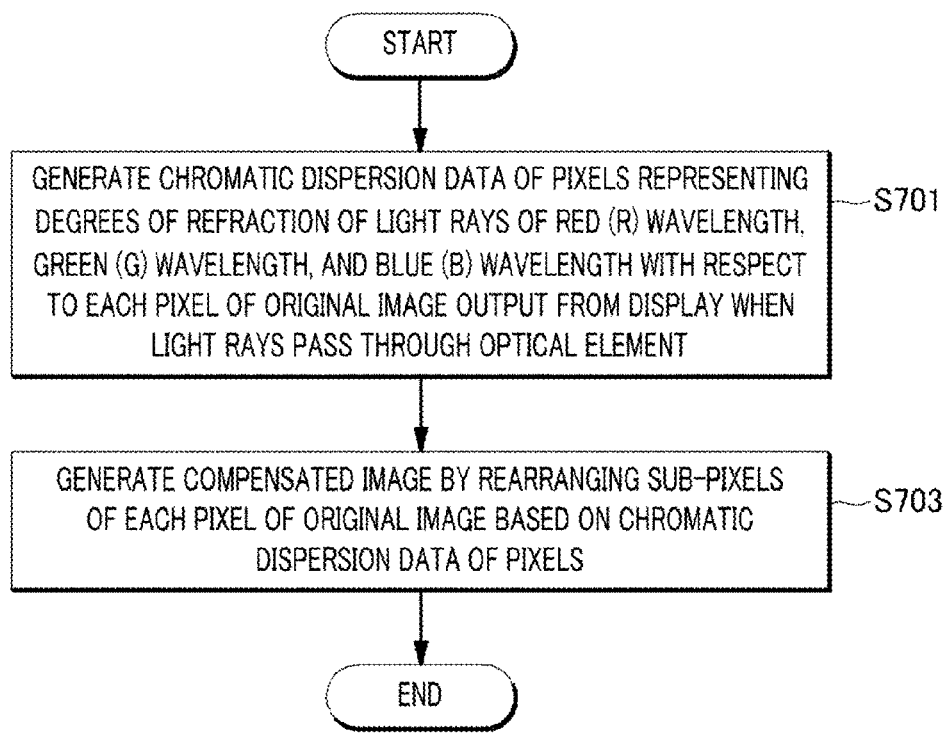
FIG. 7 is a flowchart describing operations to remove a chromatic aberration using the floating hologram apparatus in accordance with an exemplary embodiment.

FIG. 7 is a flowchart illustrating a method for removing chromatic aberration in the floating hologram apparatus 200 in accordance with an exemplary embodiment of the present disclosure.

A method for removing chromatic aberration according to the exemplary embodiment illustrated in FIG. 7 includes processes to be performed time sequentially in the floating hologram apparatus 200 according to the exemplary embodiments illustrated in FIG. 2 to FIG. 6. Therefore, descriptions of the floating hologram apparatus 200 illustrated in FIG. 2 to FIG. 6 may be identically applied to the method for removing chromatic aberration according to the exemplary embodiment illustrated in FIG. 7, even though they are omitted hereinafter.

Referring to FIG. 7, in block S701, the floating hologram apparatus 200 may perform a pre-simulation of generating chromatic dispersion data representing the degrees of refraction of light rays of a red wavelength, a green wavelength, and a blue wavelength from each pixel of an original image output from the display when the light rays pass through the optical element 210.

The floating hologram apparatus 200 may generate a mapping table regarding position information of each pixel and compensated position information of a red sub-pixel, a green sub-pixel, and a blue sub-pixel of each pixel with respect to the original image and may include the mapping table of each pixel in the chromatic dispersion data. The floating hologram apparatus 200 may include multiple mapping tables in the chromatic dispersion data of pixels depending on configuration information of the floating hologram apparatus 200. The configuration information of the floating hologram apparatus 200 may include at least one of a position of the display, a position of the optical element, a shape of the optical element, an interval between prisms of the optical element, and a position of the observer.

In block S703, the floating hologram apparatus 200 may generate a compensated image by rearranging sub-pixels of each pixel of the original image based on the chromatic dispersion data.

The floating hologram apparatus 200 may rearrange a red sub-pixel, a green sub-pixel, and a blue sub-pixel of each pixel based on the compensated position information. In this case, light rays with respect to the rearranged red sub-pixel, green sub-pixel, and blue sub-pixel may be refracted through the optical element 210 and may be focused on a single pixel at a predetermined area. The floating hologram apparatus 200 may output a compensated image in which the sub-pixels of each pixel are rearranged. The compensated image may be encoded in real time when the compensated image is output. After block S703, the floating hologram apparatus 200 may output the compensated image which is previously encoded.

In the descriptions above, blocks S701 to S703 may be divided into additional blocks or combined into fewer blocks depending on an exemplary embodiment. In addition, some of the blocks may be omitted and the sequence of the blocks may be changed if necessary.

Figure 8:
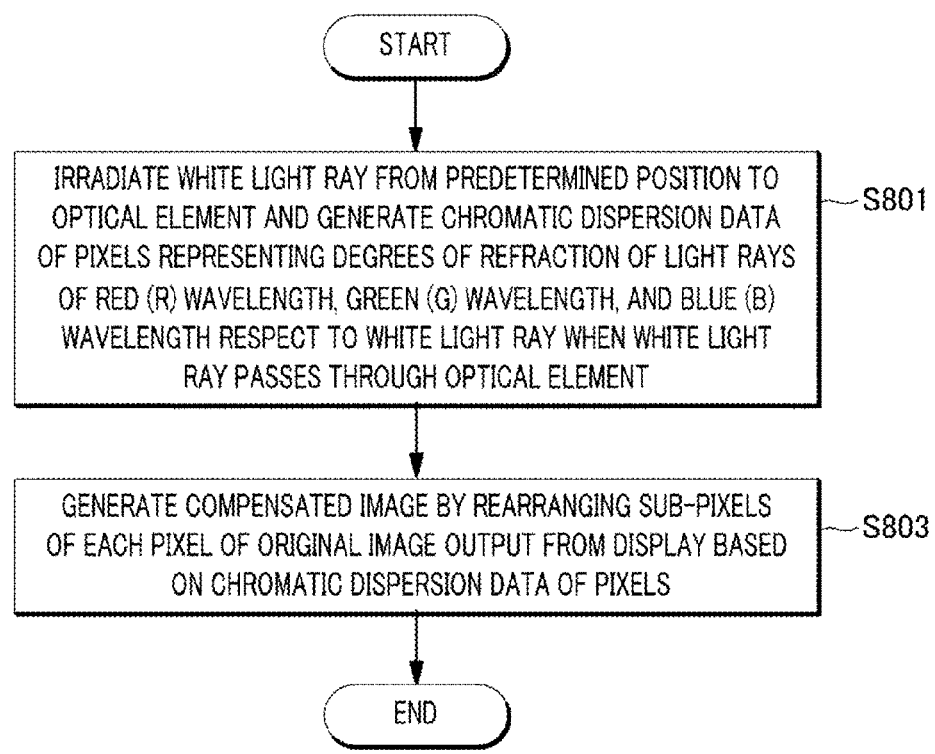
FIG. 8 is a flowchart describing operations to remove a chromatic aberration using the floating hologram apparatus in accordance with another exemplary embodiment.

FIG. 8 is a flowchart illustrating a method for removing chromatic aberration in the floating hologram apparatus in accordance with an exemplary embodiment of the present disclosure.

A method for removing chromatic aberration according to the exemplary embodiment illustrated in FIG. 8 includes processes to be performed time sequentially in the floating hologram apparatus 200 according to the exemplary embodiments illustrated in FIG. 2 to FIG. 7. Therefore, descriptions of the floating hologram apparatus 200 illustrated in FIG. 2 to FIG. 7 may be identically applied to the method for removing chromatic aberration according to the exemplary embodiment illustrated in FIG. 8, even though they are omitted hereinafter.

Referring to FIG. 8, in block S801, the floating hologram apparatus 200 may perform a pre-simulation of irradiating a white light ray from a predetermined position to the optical element 210 and generating chromatic dispersion data representing the degrees of refraction of light rays of a red wavelength, a green wavelength, and a blue wavelength with respect to the white light ray when the white light ray passes through the optical element 210. The pre-simulation may refer to a simulation performed in advance before outputting the image from the display.

The floating hologram apparatus 200 may determine positions of a red sub-pixel, a green sub-pixel, and a blue sub-pixel when a white light ray irradiated from a predetermined position toward a first hologram position corresponding to a first pixel of the original image in a predetermined area is refracted through the optical element 210 and reaches the display. The floating hologram apparatus 200 may determine positions of a red sub-pixel, a green sub-pixel, and a blue sub-pixel when a white light ray irradiated from a predetermined position toward a second hologram position corresponding to a second pixel of the original image in the predetermined area is refracted through the optical element 210 and reaches the display. The floating hologram apparatus 200 may generate chromatic dispersion data of pixels including a mapping table regarding position information of the first pixel and compensated position information of sub-pixels of the first pixel, and position information of the second pixel and compensated position information of sub-pixels of the second pixel.

In block S803, the floating hologram apparatus 200 may generate a compensated image by rearranging sub-pixels of each pixel of an original image output from the display based on the chromatic dispersion data.

The floating hologram apparatus 200 may rearrange the sub-pixels of the first pixel based on the compensated position information of the sub-pixels of the first pixel. The floating hologram apparatus 200 may rearrange the sub-pixels of the second pixel based on the compensated position information of the sub-pixels of the second pixel.

In the descriptions above, blocks S801 to S803 may be divided into additional blocks or combined into fewer blocks depending on an exemplary embodiment of the present disclosure. In addition, some of the blocks may be omitted and the sequence of the blocks may be changed if necessary. The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

200: Floating hologram apparatus
210: Optical element
400: Memory
410: Compensated image generation unit
420: Output unit
500: Simulation execution unit
510: Compensated image generation unit
600: Memory
610: Output unit

We claim:

1. A floating hologram apparatus that generates a floating hologram and includes an optical element in front of a display, comprising:
a memory configured to store chromatic dispersion data representing degrees of refraction of light rays of a red (R) wavelength, a green (G) wavelength, and a blue (B) wavelength with respect to each pixel of an original image output from the display when the light rays pass through the optical element;
a compensated image generation unit configured to generate a compensated image by rearranging sub-pixels of each pixel of the original image based on the chromatic dispersion data,
wherein the chromatic dispersion data includes multiple mapping tables corresponding to configuration information of the floating hologram apparatus, and
wherein the configuration information of the floating hologram apparatus includes an interval between prisms of the optical element; and
an output unit configured to output the compensated image.

2. The floating hologram apparatus of claim 1,
wherein the chromatic dispersion data include position information of each pixel of the original image output from the display and
compensated position information of a red sub-pixel, a green sub-pixel, and a blue sub-pixel of each pixel.

3. The floating hologram apparatus of claim 1,
wherein the compensated image generation unit reads a mapping table corresponding to the configuration information of the floating hologram apparatus from among the multiple mapping tables and generates the compensated image based on the read mapping table.

4. The floating hologram apparatus of claim 1,
wherein the compensated position information varies depending on the configuration information of the floating hologram apparatus.

5. The floating hologram apparatus of claim 1,
wherein the configuration information of the floating hologram apparatus includes at least one of a position of the display, a position of the optical element, a shape of the optical element, and a position of an observer.

6. The floating hologram apparatus of claim 1,
wherein the optical element includes a prism array in which the prisms are arranged.

7. The floating hologram apparatus of claim 2,
wherein the compensated image generation unit is further configured to rearrange the red sub-pixel, the green sub-pixel, and the blue sub-pixel of each pixel based on the compensated position information.

8. The floating hologram apparatus of claim 7,
wherein light rays corresponding to the rearranged red sub-pixel, green sub-pixel, and blue sub-pixel are refracted when the light rays pass through the optical element and focused on a single pixel at a predetermined area.

9. The floating hologram apparatus of claim 1,
wherein the output unit is configured to output the compensated image in which the sub-pixels of each pixel are rearranged, and
the compensated image is encoded while the compensated image is output.

10. The floating hologram apparatus of claim 1,
wherein the compensated image is encoded prior to outputting the compensated image, and the output unit is configured to output the compensated image which is previously encoded.

11. A floating hologram apparatus using an optical element that generates a floating hologram in a predetermined area by refracting a light ray corresponding to an original image output from a display, comprising:
a simulation unit configured to perform a pre-simulation of irradiating a white light ray from a predetermined position to the optical element and generating chromatic dispersion data representing degrees of refraction of light rays of a red (R) wavelength, a green (G) wavelength, and a blue (B) wavelength with respect to the white light ray when the white light ray passes through the optical element; and
a compensated image generation unit configured to generate a compensated image by rearranging sub-pixels of each pixel of the original image output from the display based on the chromatic dispersion data,
wherein the chromatic dispersion data includes multiple mapping tables corresponding to configuration information of the floating hologram apparatus, and
wherein the configuration information of the floating hologram apparatus includes an interval between prims of the optical element.

12. The floating hologram apparatus of claim 11, wherein the simulation unit is further configured to:
determine positions of a red sub-pixel, a green sub-pixel, and a blue sub-pixel in the display when the white light ray irradiated from the predetermined position toward a first hologram position in the predetermined area is refracted through the optical element and reaches the display, the first hologram position corresponding to a first pixel of the original image; and
determine positions of a red sub-pixel, a green sub-pixel, and a blue sub-pixel in the display when the white light ray irradiated from the predetermined position toward a second hologram position in the predetermined area is refracted through the optical element and reaches the display, the second hologram position corresponding to a second pixel of the original image.

13. The floating hologram apparatus of claim 12, wherein at least one of the mapping tables includes position information of the first pixel and compensated position information of sub-pixels of the first pixel, and position information of the second pixel and compensated position information of sub-pixels of the second pixel.

14. The floating hologram apparatus of claim 13, wherein the compensated image generation unit is further configured to:
rearrange the sub-pixels of the first pixel based on the compensated position information of the sub-pixels of the first pixel; and
rearrange the sub-pixels of the second pixel based on the compensated position information of the sub-pixels of the second pixel.

15. A floating hologram apparatus that generates a floating hologram and includes a display and an optical element arranged in front of the display, comprising:
a memory configured to store a corrected image generated by rearranging sub-pixels of each pixel of an original image output from the display based on the chromatic dispersion data; and
an output unit configured to output the corrected image,
wherein the chromatic dispersion data represent degrees of refraction of light rays of a red (R) wavelength, a green (G) wavelength, and a blue (B) wavelength corresponding to each pixel of the original image when the light rays pass through the optical element,
wherein the chromatic dispersion data includes multiple mapping tables corresponding to configuration information of the floating hologram apparatus, and
wherein the configuration information of the floating hologram apparatus includes an interval between prims of the optical element.

\* \* \* \* \*